United States Patent
Whittaker et al.

(10) Patent No.: US 6,739,568 B2
(45) Date of Patent: May 25, 2004

(54) APPARATUS FOR ISOLATING AND LEVELING A MACHINE FOUNDATION

(75) Inventors: Wayne H. Whittaker, Horton, MI (US); Patrick D. Carl, Jackson, MI (US); Timothy L. Spahr, Jackson, MI (US); David L. Curtis, Jackson, MI (US)

(73) Assignee: Unisorb, Inc., Jackson, MI (US)

( * ) Notice: Subject to any disclaimer, the term of this patent is extended or adjusted under 35 U.S.C. 154(b) by 0 days.

(21) Appl. No.: 10/280,445

(22) Filed: Oct. 25, 2002

(65) Prior Publication Data

US 2004/0079856 A1 Apr. 29, 2004

(51) Int. Cl.⁷ ................................................. F16M 3/00
(52) U.S. Cl. ..................... 248/638; 52/167.4; 52/167.7; 248/562; 248/566; 248/678
(58) Field of Search ................................ 248/638, 678, 248/679, 673, 635–637, 592, 593, 595, 602, 632, 633, 560, 562, 615, 566; 52/167.2, 167.4, 167.6, 167.7, 167.8; 267/136, 139, 140, 140.11

(56) References Cited

U.S. PATENT DOCUMENTS

| | | | | |
|---|---|---|---|---|
| 2,359,915 A | * | 10/1944 | Hussman | 267/135 |
| 2,605,066 A | * | 7/1952 | Brown | 248/566 |
| 2,660,386 A | | 11/1953 | Munro | |
| 2,660,387 A | * | 11/1953 | Roy | 248/574 |
| 3,239,185 A | | 3/1966 | Sweeney et al. | |
| 3,332,647 A | * | 7/1967 | Young | 248/602 |
| 4,047,427 A | * | 9/1977 | Young | 73/862.041 |
| 4,135,392 A | * | 1/1979 | Young | 73/862.635 |
| 4,565,039 A | * | 1/1986 | Oguro et al. | 52/167.4 |
| 5,242,147 A | * | 9/1993 | Kemeny | 248/638 |
| 5,291,967 A | | 3/1994 | Aoki | |
| 5,456,047 A | | 10/1995 | Dorka | |
| 5,573,220 A | * | 11/1996 | Whittaker et al. | 248/638 |
| 5,577,703 A | * | 11/1996 | Young | 248/550 |
| 5,682,712 A | * | 11/1997 | Kemeny | 52/167.7 |
| 5,738,330 A | | 4/1998 | Folkens et al. | |
| 5,797,228 A | * | 8/1998 | Kemeny | 52/167.7 |
| 6,547,225 B1 | * | 4/2003 | Nelson | 267/64.27 |

FOREIGN PATENT DOCUMENTS

DE          2327310          * 1/1974

* cited by examiner

Primary Examiner—Ramon O. Ramirez
Assistant Examiner—Tan Le
(74) Attorney, Agent, or Firm—Young & Basile, P.C.

(57) ABSTRACT

An apparatus for isolating and leveling a machine foundation with respect to a substructure of a building or the ground. The apparatus of the present invention provides an enclosure connectable to the machine foundation. A load bearing member is disposed within and adjustably connected to the enclosure. A resilient member is positioned between and in contact with the bearing member and the substructure for supporting and isolating the machine foundation from the substructure and providing a leveling mechanism to level the machine foundation. At least one gauge extends between the bearing member and the substructure to determine the distance between the bearing member and the substructure so that the machine foundation may be leveled. Additional stabilizers are provided with an anchor plate assembly adjustably connected to the enclosure. The stabilizers include an isolating member biased against a sidewall of the substructure by the anchor plate assembly to provide added stability to the machine foundation.

30 Claims, 3 Drawing Sheets

APPARATUS FOR ISOLATING AND LEVELING A MACHINE FOUNDATION

FIELD OF THE INVENTION

The present invention relates to machine foundations, and more particularly, an apparatus for isolating and leveling a machine foundation with respect to a substructure.

BACKGROUND OF THE INVENTION

When installing and setting up heavy-duty industrial machinery (i.e., machinery, equipment, presses, etc.), it is difficult to properly isolate a machine from the substructure (i.e., floor, ground, etc.) of a building or facility or from the ground or soil of the earth. Such isolation may be desired to isolate vibration from a machine that is sensitive to vibration, as in the case of a magnetic resonance imaging (MRI) machine. In the alternative, such isolation may be required to isolate the vibration created by a machine from a substructure. The shock and vibration generated or realized by these machines may create misalignments of the machine due to the forces and the settling of the substructure or the machine's foundation. Proper alignment, including leveling, flatness, and the like, is essential in order to operate the machinery efficiently, economically and safely.

Prior designs have attempted to isolate a machine foundation from a substructure by providing a concrete well in the substructure. Sand or other fill materials line the walls of the concrete well and create a barrier between the machine's concrete foundation and the substructure. Springs have also been utilized between the substructure and the machine's concrete foundation to isolate and support the machine foundation from the substructure. However, these designs do not provide a method or apparatus for easily and effectively leveling the machine.

Other past designs have utilized machine foundations that are integral with a substructure. Although some of these designs have provided leveling mechanisms between the machine and the foundation, the design of the machine foundation and the substructure must be completely re-engineered when replacing the existing industrial machinery. Re-engineering a machine foundation and a substructure is a costly proposition that is undesirable in the field of industrial machinery.

Thus, it would be desirable to provide an apparatus for isolating and leveling a machine foundation with respect to a substructure. It would also be desirable to have an apparatus for isolating and leveling a machine foundation wherein the apparatus and foundation could be reused with respect to a replacement machine.

SUMMARY OF THE INVENTION

The present invention provides an apparatus for isolating a machine foundation from a substructure of a building while also providing proper adjustments to level the machine foundation. The apparatus of the present invention provides an enclosure connected to the machine foundation wherein the enclosure has an upper portion and a lower portion adjustably connected to one another to allow for various sizes of the enclosure. A bearing member is disposed within the enclosure and is adjustably connected to the enclosure. A resilient member is positioned between and in connection with the bearing member and the substructure for isolating and leveling the machine foundation relative to the substructure. In an alternative embodiment, a recess may be formed on a surface of the resilient member adjacent the bearing member, and the bearing member may provide a protruding surface that complementarily engages the recess of the resilient member to increase the stability of the resilient member.

The present invention may also provide at least one gauge extending between the bearing member and the substructure to determine the distance between the bearing member and the substructure for purposes of leveling the machine foundation relative to the substructure.

The present invention may also provide stabilizers having an anchor plate assembly adjustably connected to the enclosure. An isolating member is preloaded against the substructure by the anchor plate assembly to provide added stability to the machine foundation. The anchor plate assembly may apply a force to the isolating member that is substantially perpendicular to the axis in which the bearing member applies a load to the resilient member.

BRIEF DESCRIPTION OF THE DRAWINGS

The description herein makes reference to the accompanying drawings, wherein like reference numerals refer to like parts throughout several views and wherein.

DESCRIPTION OF THE PREFERRED EMBODIMENT

Figure 1:
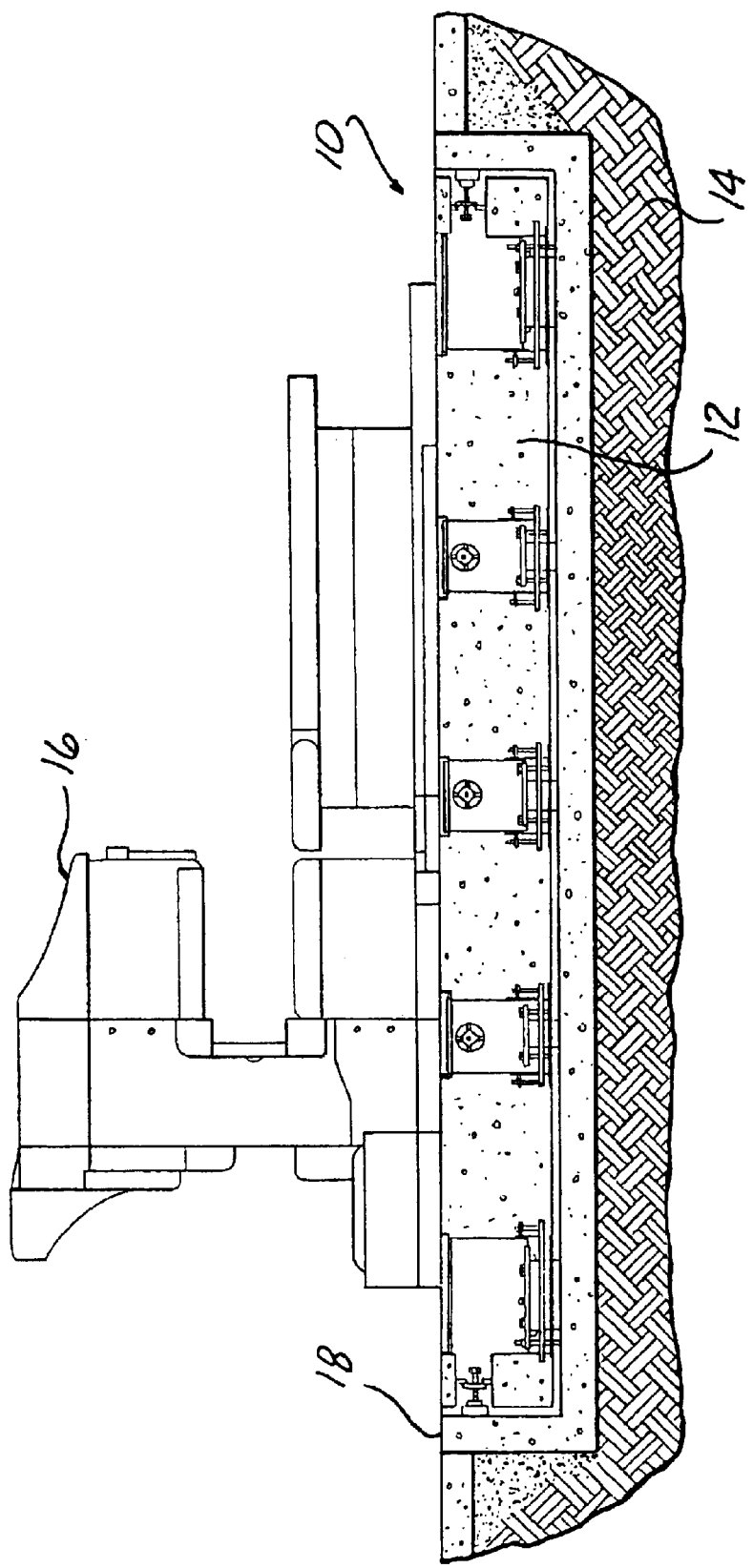
FIG. 1 is a sectional view showing the apparatus of the present invention being utilized to isolate and level the foundation of a MRI machine.

Referring to the drawings, the present invention will now be described in detail with reference to the disclosed embodiments.

FIGS. 1–5 illustrate the apparatus 10 of the present invention for isolating and leveling a machine foundation 12 with respect to a substructure 14 of a building (not shown) or the ground. As seen in FIG. 1, the apparatus 10 of the present invention may be used to isolate and level the machine foundation 12 of a machine 16. The apparatus 10 may be utilized to isolate the vibration of a machine 16 from the substructure 14, or the apparatus 10 may isolate the machine 16 from the vibration of the substructure 14 wherein the machine 16 is sensitive to vibration, such as in the case of a magnetic resonance imaging (MRI) machine installed in a hospital. The application of the present invention is not limited to MRI machines 16, but rather, any large industrial machine which requires the isolation of vibration and shockwaves and requires the leveling of a foundation may be utilized to isolate and level the machine foundation 12 from the substructure 14.

The machine 16 is typically installed within a building by providing a concrete well 18 in the substructure 14 of the building. The machine foundation 12 is fabricated from concrete wherein the footings of the machine 16 are set in the concrete machine foundation 12. A plurality of the apparatuses 10 of the present invention are set within the machine foundation 12 at strategically placed locations. For instance, the apparatuses 10 may be equally spaced within the machine foundation 12 and positioned at the corners of the machine foundation 12. The machine foundation 12 is placed within the concrete well 18 of the substructure 14, and a small space is created between the concrete well 18 and the machine foundation 12 by the apparatuses 10. The apparatuses 10 utilize resilient members 20 and isolating members 22 to separate and isolate the machine foundation 12 from the substructure 14. By isolating the machine foundation 12 from the substructure 14, the apparatuses 10 provide a way to level the machine foundation 10 while also isolating vibration and shockwaves from the substructure 14.

Figure 2:
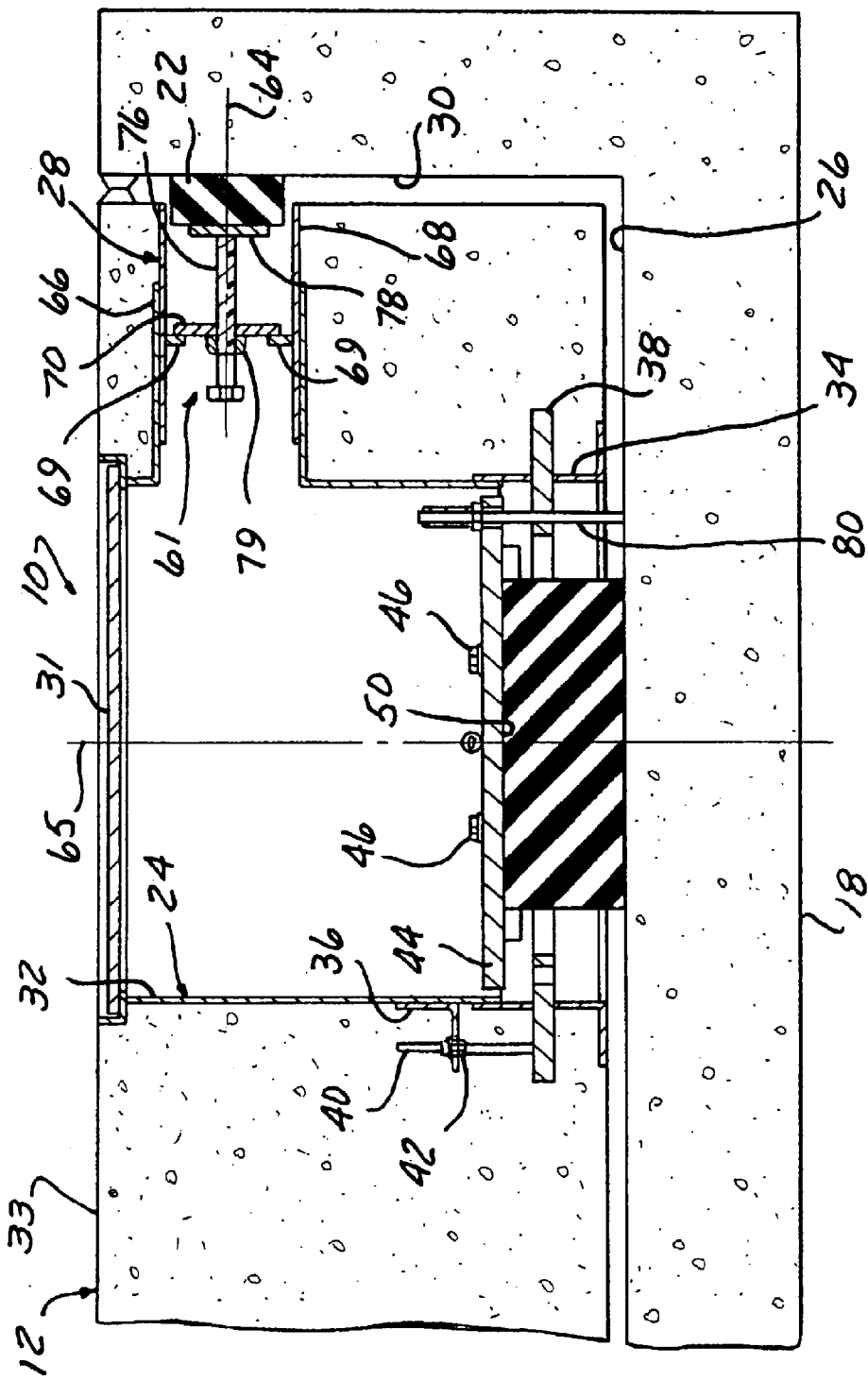
FIG. 2 is a cross-sectional view of the apparatus of the present invention taken in the direction of arrows 2—2 in FIG. 3.
Figure 4:
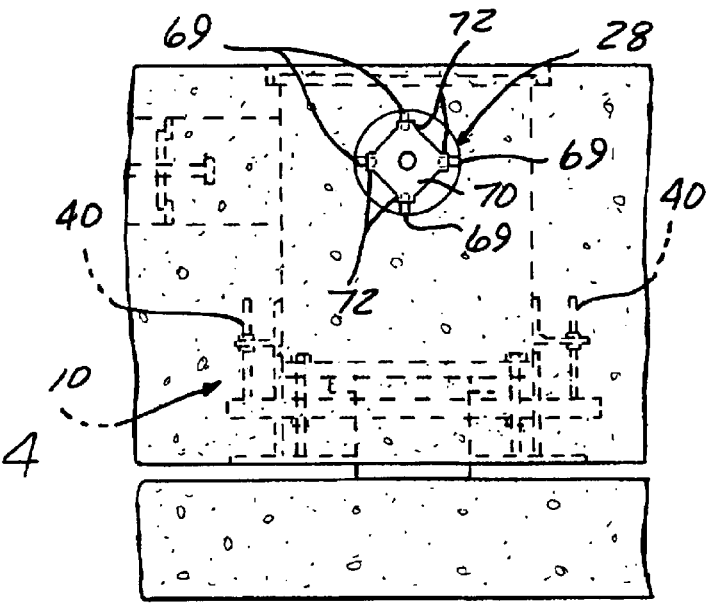
FIG. 4 is a top view of the apparatus of the present invention.
Figure 3:
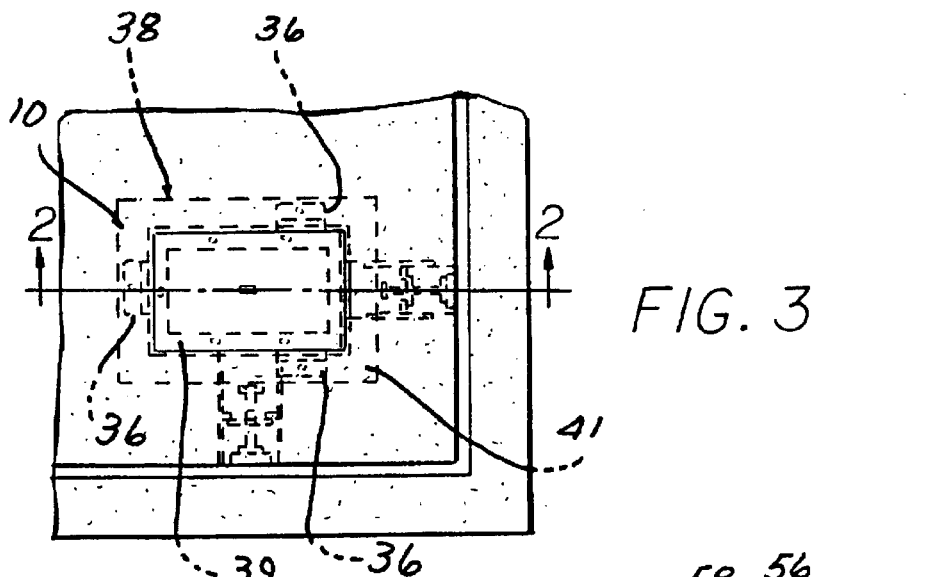
FIG. 3 is a top plan view of the apparatus of the present invention shown in FIG. 2.

As seen in FIGS. 2–4, the apparatus 10 of the present invention provides a substantially rectangular enclosure 24 that is set within the concrete of the machine foundation 12 and extends the entire depth or height of the machine foundation 12. The enclosure 24 may also provide two cylindrical passageways or outlets 28 in the sides of the enclosure 24 that provide access to sidewalls 30 of the substructure 14. It should be noted that the present invention is not limited to the enclosure 24 being substantially rectangular, but rather, the enclosure 24 may be constructed in any geometric configuration that will allow for the proper isolation and leveling of the machine foundation 12. In addition, the enclosure 24 may be fabricated from various materials. However, if the apparatus 10 is used in conjunction with a MRI machine, then a non-ferrous alloy, such as aluminum, should be utilized to construct the enclosure 24 so that the enclosure 24 will not affect the operation of the MRI machine 16. A removable cover 31 covers the top of the enclosure 24 and is recessed just below the top surface 33 of the machine foundation 12. The cover 31 should also be fabricated from a nonferrous alloy if used in conjunction with an MRI machine.

In order to adjust the depth or height of the enclosure 24 to correspond to the depth or height of the machine foundation 12, the enclosure 24 has an upper portion 32 and a lower portion 34 that are telescopically received within one another. Specifically, the upper portion 32 of the enclosure 24 is telescopically received within the lower portion 34 of the enclosure 24. The upper portion 32 and the lower portion 34 of the enclosure 24 are adjustably connected through the use of three substantially right angle flanges 36 that are connected to and extend outward from the exterior of the upper portion 32 of the enclosure 24. The flanges 36 each have an aperture extending through the outwardly extending portion of the flange 36. The flanges 36 are equally spaced about the outer perimeter of the enclosure 24. The lower portion 34 of the enclosure 24 has an anchor ring 38 integrally connected to the lower portion 34 of the enclosure 24. The anchor ring 38 has an inner perimeter 39 and an outer perimeter 41 relative to the enclosure 24 that both extend at a substantially right angle from the lower portion 34 of the enclosure 24. Three rods 40 are integrally connected to the anchor ring 38 and extend upward toward the flanges 36 of the upper portion 32 of the enclosure 24. The three rods 40 correspond in location and number to the apertures in the flanges 36 of the enclosure 24. The rods 40 extend through the apertures provided in the flanges 36, and three adjustable slip joints 42, connected to each of the flanges 36, receive and engage the rods 40. The adjustable slip joints 42 provide a releasable locking mechanism that releaseably locks the rods 40 within the adjustable slip joints 42 and allows the upper portion 32 and the lower portion 34 of the enclosure 24 to telescopically move relative to one another to provide for the desired height of the enclosure 24.

To apply the load of the machine 16 and the machine foundation 12 to the resilient member 20, the apparatus 10 of the present invention provides a load bearing member 44. The load bearing member 44 is a substantially flat, plate-like structure disposed within the enclosure 24. Four threaded fasteners 46 connect the bearing member 44 to the inner perimeter 39 of the anchor ring 38. The threaded fasteners 46 can be adjusted to adjust the distance between the bearing member 44 and the anchor ring 38, thereby adjusting the load applied to the resilient member 20 and the distance between the machine foundation 12 and a floor 26 of the substructure 14. However, the bearing member 44 can only be lowered to a point in which the upper portion 32 of the enclosure 24 bottoms out or engages the anchor ring 38. This prevents the overloading of the resilient member 20. It should be noted that the present invention anticipates other means of adjusting the distance between the bearing member 44 and the anchor ring 38 beside the fasteners 46. For instance, hydraulic jacks may be utilized to adjust the height of the bearing member 44.

The load of the bearing member 44 is applied to the resilient member 20 by having the resilient member 20 positioned between and in contact with a bottom surface 50 of the bearing member 44 and the floor 26 of the substructure 14. The resilient member 20 is a substantially rectangular block of rubber material that allows for a certain amount of compressibility. This compressibility not only isolates the vibration and shock of the machine foundation 12 from the substructure 14, but also allows for the adjustment of the fasteners 46 so as to level the machine 16 and its foundation 12. The fasteners 46 can also adjust the vertical stiffness of the machine foundation 12 by compressing the resilient members 20 more to increase the stiffness and less to reduce the stiffness of the machine foundation 12. Although the apparatus 10 of the present invention and the application thereof described may be best suited for a resilient member 20 fabricated from a rubber material, the present invention is not limited to the resilient member 20 being fabricated from a rubber material. The resilient member 20 may be fabricated from various springs, such as steel springs, or airbags. If the isolation of vibration is not a concern, then the resilient member 20 may be fabricated from a solid steel block in order to provide a more stable material for leveling the machine foundation 12.

Figure 5:
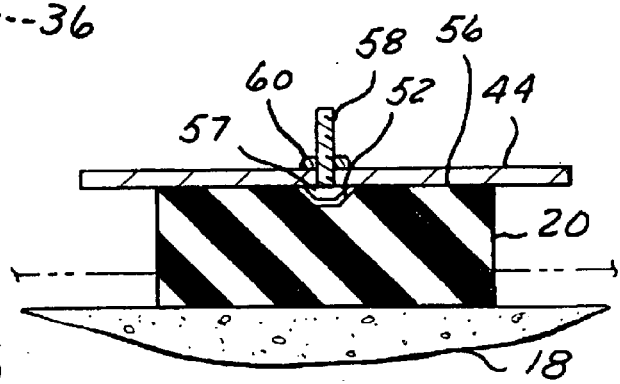
FIG. 5 is a breakaway sectional view of an alternative embodiment of the resilient member and bearing member of the present invention.

In an alternative embodiment, the structure of the resilient member 20 may be modified in order to stabilize the resilient member 20 by reducing the amount of horizontal movement of the resilient member 20. As seen in FIG. 5, the resilient member 20 provides a recess formed in substantially the center of a top surface 56 of the resilient member 20. The recess 52 may have a frusto-conical shape extending downward into the top surface 56 of the resilient member 20. A complementarily engaging structure 57 is connected to the bottom surface 50 of the bearing member 44 through the use of a threaded fastener 58. The complementarily engaging member 57 is connected to the end of a threaded fastener 58. The threaded fastener extends through an aperture provided in the bearing member 44 and is secured to the bearing member 44 by the use of a threaded nut 60. The complementarily engaging member 57 has a frusto-conical shape which matingly engages the recess 52 provided in the top surface 56 of the resilient member 20. As the load is applied through the bearing member 44 to the resilient member 20, the complementarily engaging member 57 works to reduce the amount of horizontal movement of the resilient member 20. The complementarily engaging member 57 may be fabricated from a rubber material similar to the resilient member 20 or may be fabricated from any other substantially high strength material.

The apparatus 10 of the present invention may also provide horizontal stabilizers 61 in order to stabilize the machine foundation 12 in a horizontal direction while also providing a stiffness adjustment along the horizontal or Y axis. In order to utilize the horizontal stabilizers 61, the enclosure 24 is located relatively close to one of the sidewalls 30 of the substructure 14 so that the horizontal stabilizer 61 can engage the sidewall 30 of the substructure 14. In addition, if the enclosure 24 is located within a corner of the machine foundation 12, the horizontal stabilizer 61 may be utilized on adjacent sidewalls 30 of the substructure 14, as seen in FIG. 4.

As seen in FIGS. 2–4, the horizontal stabilizer 61 is disposed within the outlet or passageway 28 of the enclosure 24. Since the horizontal stabilizer 61 engages the sidewalls 30 of the substructure 14, the passageway 28 of the enclosure 24 has a longitudinal axis 64 that is substantially perpendicular to a vertical, longitudinal axis 65 of the enclosure 24. The passageway 28 of the enclosure 24 is substantially cylindrical and provides an inner portion 66 and an outer portion 68 that are telescopically adjustable so that the length of the passageway 28 may be adjusted to correspond to the length of the machine foundation 12 that extends between the enclosure 24 and an end of the machine foundation 12. The inner portion 66 and the outer portion 68 of the passageway 28 have a slip joint feature that allows for easy telescopic adjustment of the inner portion 66 and the outer portion 68. The telescopic arrangement of the passageway 28 is such that the outer portion 68 has a segment that is inside a segment of the inner portion 66 of the passageway 28. It should be noted that the invention is not limited to a cylindrical passageway 28, but rather, the passageway 28 may utilize any geometry that provides for a horizontal stabilizer 61, as described in the present invention.

In order to horizontally stabilize the machine foundation 12, four substantially rectangular tabs 69 extend radially inward from the inner circumference of the outer portion 68 of the passageway 28. The four tabs 69 are spaced substantially 90° from one another. An anchor plate 70 has a substantially diamond configuration with four fingers 72 corresponding in position to the tabs 69 in the outer portion 68 of the passageway 28. The anchor plate 70 provides a "twist lock" feature by having the four fingers 72 of the anchor plate 70 engage the tabs 69 on the outer portion 68 of the passageway 28 in a specific configuration. When the anchor plate 70 is rotated 45°, the four fingers 72 of the anchor plate 70 disengage the tabs 69 of the outer portion 68 of the passageway 28. The anchor plate 70 provides a threaded aperture for threadably receiving a bolt or rod 76, and a substantially cylindrical isolator plate 78 is connected to the end of the rod 76. The isolating member 22 also has a substantially cylindrical configuration and is positioned between and in contact with the isolator plate 78 and the sidewall 30 of the substructure 14. The rod 76 may be threadably adjusted with respect to the anchor plate 70 so that the amount of preload applied to the isolating member 22 by the isolator plate 78 may be adjusted by adjusting the length of the rod 76. Threaded nut 79 secures the rod 76 in a predetermined position. The isolating member 22 is fabricated from a rubber material, but the isolating member 22 may also be fabricated from a spring or airbag.

In operation, the enclosure 24 is set within the concrete of the machine foundation 12. The apparatuses 10 of the present invention are placed in strategic locations within the machine foundation 12 in order to properly isolate vibration from the machine foundation 12 to the substructure 14, as well as provide specific leveling adjustments to the machine foundation 12. In setting the enclosures 24 within the concrete of the machine foundation 12, the length of the enclosure 24 must be properly adjusted for the height or depth of the machine foundation 12 by adjusting the upper portion 32 and the lower portion 34 of the enclosure 24 through the use of the adjustable slip joint 42. Once the enclosures 24 are set in the machine foundation 12, the machine foundation 12 is placed in the concrete well 18 of the substructure 14. The resilient member 20 is placed on the bottom of the enclosure 24, and the bearing member 44 is secured to the anchor ring 38 through the use of the fasteners 46. The fasteners 46 are tightened until a sufficient load is applied to the resilient member 20 such that the machine foundation 12 lifts off the floor 26 of the substructure 14. Gauges or gauge pins 80 may be installed through corresponding apertures in the bearing member 44 and the anchor ring 38. The gauges 80 extend to the floor 26 of the substructure 14 to determine the distance between the bearing member 44 and the floor 26 of the substructure 14. The gauges 80 provide the user with an indication as to whether the machine foundation 12 is level. By reading the gauges 80 from all of the apparatuses 10 in the machine foundation 12, proper adjustments may be made to the fasteners 46 in the bearing member 44 and the anchor ring 38 by lowering or raising certain areas of the machine foundation 12 so as to properly level the machine foundation 12. In addition, the stiffness of the machine foundation 12 along the vertical axis 65 may be adjusted by compacting the resilient member 20 further if greater stiffness is desired and reducing the amount of compactness of the resilient member 20 if less stiffness is desired. The natural frequency of the machine foundation 12 can also be altered by adjusting the amount of vertical stiffness in the resilient member 20 or varying the amount of vertical stiffness among the various resilient members.

After the proper adjustments are made to the bearing member 44, the horizontal stabilizers 61 may be installed. The rod 76 along with the anchor plate 70 and isolator plate 78 are inserted into the passageway 28 of the enclosure 24. The isolating member 22 is positioned between the isolator plate 78 and the sidewall 30 of the substructure 14. The anchor plate 70 is inserted such that the four fingers 72 of the anchor plate 70 do not engage the tabs 69 located in the outer portion 28 of the passageway 28. Force is applied to the anchor bolt 70 so as to preload the isolating member 22. A sufficient amount of deformation of the isolating member 22 must occur to allow the anchor plate 70 to extend beneath the tabs 69 in the outer portion 68 of the passageway 28 in a locked position. The anchor plate 70 is then rotated 45° so that the four fingers 72 of the anchor plate 70 may engage the tabs 69 in the outer portion 68 of the passageway 28. The bias from the isolating member 22 forces the anchor plate 70 against the tabs 69 so that a preload is applied and maintained against the sidewall 30 of the substructure 14. The horizontal stiffness of the machine foundation 12 may be adjusted by threadably adjusting the length of the rod 76. If a greater amount of horizontal stiffness is desired, the rod 76 is threaded outward toward the sidewall 30 of the substructure 14 such that the isolator plate 78 deflects or deforms the isolating member 22 to a greater degree. If a lesser amount of horizontal stiffness is desired, the rod 76 is threaded inward toward the enclosure 24 such that the isolator plate 70 decreases the amount of deflection or deformation to the isolating member 22.

If the machine 16 is replaced with another machine (not shown), the machine foundation 12 and the apparatuses 10 may be utilized in conjunction with the new machine. The old machine 16 is removed from the machine foundation 12, and the new machine is set within the machine foundation. Depending on the length of time the apparatuses 10 have been in use, the resilient members 20 may need to be replaced with new resilient members (not shown) fabricated from the same or different materials as the previous resilient members 20, depending on the application. The set up for the new machine is the same procedure as noted above.

While the invention has been described in connection with what is presently considered to be the most practical and preferred embodiment, it is to be understood that the invention is not to be limited to those disclosed embodiments, but to the contrary, it is intended to cover various modifications and equivalent arrangements included within the spirit and scope of the appended claims. The scope is to be accorded the broadest interpretation so as to encompass all such modifications on equivalent structures as is permitted under the law.

What is claimed:

1. An apparatus for isolating and leveling a machine foundation with respect to a substructure, comprising:

a rigid enclosure connectable to said machine foundation wherein said enclosure is telescopically adjustable;

a bearing member disposed within and adjustably connected to said enclosure; and a resilient member positioned between and in contact with said bearing member and said substructure for isolating said machine foundation from said substructure.

2. The apparatus stated in claim 1, wherein said enclosure further comprises:

an upper portion and a lower portion adjustably connected to one another to allow for various sizes of said enclosure.

3. The apparatus stated in claim 1, further comprising:

at least one threaded fastener extending between said bearing member and said enclosure to provide an adjustable connection therebetween.

4. The apparatus stated in claim 1, further comprising:

an anchor plate assembly adjustably connected to said enclosure; and an isolating member biased against said substructure by said anchor plate assembly to provide added stability to said machine foundation.

5. The apparatus stated in claim 4, further comprising:

said bearing member applying a load to said resilient member along a first axis; and said anchor plate assembly applying a force to said isolating member along a second axis wherein said first axis is substantially perpendicular to said second axis.

6. An apparatus for isolating and leveling a machine foundation with respect to a substructure, comprising:

an enclosure connectable to said machine foundation;

a bearing member disposed within and adjustable connected to said enclosure;

a resilient member positioned between and in contact with said bearing member and said substructure for isolating said machine foundation from said substructure; and at least one gauge extending between said bearing member and said substructure to determine the distance between said bearing member and said substructure.

7. An apparatus for isolating and leveling a machine foundation with respect to a substructure, comprising:

an enclosure connectable to said machine foundation;

a bearing member disposed within and adjustably connected to said enclosure;

a resilient member positioned between and in contact with said bearing member and said substructure for isolating said machine foundation from said substructure;

a recess formed on a surface of said resilient member adjacent said bearing member; and said bearing member having a protruding surface complementarily engaging said recess of said resilient member for further stabilizing said resilient member.

8. An apparatus for isolating and leveling a machine foundation with respect to a substructure, comprising:

a rigid enclosure connectable to said machine foundation, and said enclosure having an upper portion and a lower portion telescopically connected to one another to allow for various sizes of said enclosure;

a bearing member disposed within said enclosure and adjustably connected to said lower portion of said enclosure; and a resilient member positioned between and in contact with said bearing member and said substructure for isolating said machine foundation from said substructure.

9. The apparatus stated in claim 8, further comprising:

said upper portion of said enclosure having at least one flange having an aperture extending therethrough;

said lower portion of said enclosure having an anchor ring with at least one rod connected thereto and extending through said aperture in said flange of said upper portion; and a slip joint connected to said flange of said upper portion for releasably connecting said rod to said flange for telescopically adjusting said upper portion to said lower portion of said enclosure.

10. The apparatus stated in claim 8, further comprising:

said lower portion of said enclosure having an anchor ring with at least one aperture extending therethrough;

said bearing member having at least one aperture extending therethrough; and at least one adjustable fastener extending through said aperture of said anchor ring and said aperture of said bearing member to adjustably connect said bearing member to said lower portion of said enclosure.

11. The apparatus stated in claim 8, further comprising:

a recess formed on a surface of said resilient member adjacent said bearing member; and a mating member complementarily engaging said recess of said resilient member, and said mating member adjustably connected to said bearing member.

12. The apparatus stated in claim 8, further comprising:

at least one gauge connected to said bearing member for determining the distance between said bearing member and said substructure.

13. The apparatus stated in claim 8, further comprising:

an anchor plate assembly disposed within and adjustably connected to said enclosure; and an isolating member positioned between said anchor plate assembly and said substructure and biased against said substructure by said anchor plate assembly to provide added stability to said machine foundation.

14. The apparatus stated in claim 13, wherein said anchor plate assembly further comprises:

a plurality of tabs extending within said enclosure;

an anchor plate releasably engageable with said plurality of tabs;

a rod adjustably connected to said anchor plate; and an isolator plate connected to said rod and engageable with said isolating member wherein said isolator plate applies a load to said isolator member, biasing said anchor plate against said plurality of tabs and said isolating member against said substructure.

15. The apparatus stated in claim 13, further comprising:

said bearing member applying a load to said resilient member along a substantially vertical axis; and said anchor plate assembly applying a force to said isolating member along a substantially horizontal axis.

16. An apparatus for isolating a machine foundation from a substructure of a building, comprising:

an enclosure connectable to said machine foundation, and said enclosure having an upper portion and a lower portion telescopically and adjustably connected to one another to allow for various sizes of said enclosure;

a bearing member disposed within said enclosure and adjustably connected to said lower portion of said enclosure;

a resilient member positioned between and in contact with said bearing member and said substructure for isolating said machine foundation from said substructure wherein said bearing member applies a load to said resilient member along a substantially vertical axis;

an anchor plate assembly disposed within and adjustably connected to said enclosure; and an isolating member positioned between said anchor plate assembly and said substructure, and said isolating member biased against said substructure by said anchor plate assembly along a substantially horizontal axis to provide added stability to said machine foundation.

17. The apparatus stated in claim 16, further comprising:

said upper portion of said enclosure having at least one flange having an aperture extending therethrough, said lower portion of said enclosure having an anchor ring with at least one rod connected thereto and extending through said aperture in said flange of said upper portion; and a slip joint connected to said flange of said upper portion for adjustably securing said rod to said flange for adjustably connecting said upper portion to said lower portion of said enclosure.

18. The apparatus stated in claim 16, further comprising:

said lower portion of said housing having an anchor ring with at least one aperture extending therethrough;

said bearing member having at least one aperture extending therethrough; and at least one adjustable fastener extending through said aperture of said anchor ring and said aperture of said bearing member to adjustably connect said bearing member to said lower portion of said enclosure.

19. The apparatus stated in claim 16, further comprising:

said resilient member fabricated from a rubber material.

20. The apparatus stated in claim 16, further comprising:

said resilient member fabricated from a spring.

21. The apparatus stated in claim 16, further comprising:

said resilient member fabricated from an airbag.

22. The apparatus stated in claim 16, further comprising:

said resilient member fabricated from a steel block.

23. The apparatus stated in claim 19, further comprising:

a recess formed on a surface of said resilient member adjacent said bearing member; and a mating member complementarily engaging said recess in said resilient member, and said mating member adjustably connected to said bearing member.

24. The apparatus stated in claim 16, further comprising:

at least one gauge connected to said bearing member for determining the distance between said bearing member and said substructure.

25. The apparatus stated in claim 16, wherein said anchor plate assembly further comprises:

a plurality of tabs extending along a plane within said enclosure;

an anchor plate releasably engageable with said tabs;

a rod adjustably connected to said anchor plate; and an isolator plate connected to said rod and engageable with said isolating member wherein said isolator plate applies a force to said isolator member to bias the anchor plate against said tabs and bias said isolating member against said substructure.

26. The apparatus stated in claim 16, further comprising:

said isolating member fabricated from a rubber material.

27. The apparatus stated in claim 16, further comprising:

said isolating member fabricated from a spring.

28. The apparatus stated in claim 16, further comprising:

said isolating member fabricated from an airbag.

29. The apparatus stated in claim 16, further comprising:

a plurality of enclosures spacedly connectable to said machine foundation wherein each of said enclosures includes at least one of said bearing member and one of said resilient member.

30. The apparatus stated in claim 29, further comprising:

said resilient members having various loads applied thereon to vary the natural frequency of said machine foundation.

* * * * *

UNITED STATES PATENT AND TRADEMARK OFFICE
CERTIFICATE OF CORRECTION

PATENT NO. : 6,739,568 B2  Page 1 of 1
DATED : May 25, 2004
INVENTOR(S) : Whittaker et al.

It is certified that error appears in the above-identified patent and that said Letters Patent is hereby corrected as shown below:

Column 7,
Line 54, please delete "adjustable" and insert -- adjustably --.

Signed and Sealed this

Twenty-seventh Day of July, 2004

JON W. DUDAS
*Acting Director of the United States Patent and Trademark Office*